United States Patent Office 3,416,905
Patented Dec. 17, 1968

3,416,905
PROCESS FOR MANUFACTURE OF POROUS ABRASIVE ARTICLES
Arthur Waugh, Brookline, Mass., assignor to Lexington Laboratories, Inc., Cambridge, Mass., a corporation of Massachusetts
No Drawing. Filed June 25, 1965, Ser. No. 467,126
4 Claims. (Cl. 51—296)

ABSTRACT OF THE DISCLOSURE

A process for manufacturing abrasive articles of intricate shape by pouring or injection molding a fluid mixture. This mixture includes abrasive particles, glass frit and a suspending agent in a meltable binder.

---

This invention relates to a method of forming porous articles composed of vitrified bonded refractory materials and more particularly relates to a method for producing abrasive articles from a uniform suspension of powdered ceramic materials of relatively large grain size.

Abrasive tools such as grinding wheels are usually porous to permit cooling by a fluid which removes the heat generated during grinding. Abrasive tools are structures in which hard grains of relatively large size are held in bond by a softer binder. A substantial volume of the conventional abrasive wheel is taken up by voids which are interconnected and act as passageways for the coolant. The structure of the abrasive wheel is described by the relationship of the abrasive grains to the bonding material and the relationship of the solid materials to the voids. In the ideal abrasive tool, the hard grains would be uniformly distributed in a random manner and the voids would permit efficient cooling of the heated grains.

It has been customary to manufacture abrasive wheels by first forming a mixture of the hard cutting grains of the appropriate mesh with the softer binder, such as glass frit and then blending these with a fugitive adhesive. The resultant mixture is then formed by compression molding into the desired shape which in turn is fired to drive off the fugitive binder and to vitreously bond the remaining mixture into a relatively homogeneous product wherein the glass securely retains the cutting composition. Numerous problems have been encountered in the utilization of this prior art process and in particular it has been found that substantial pressures are required to achieve any significant degree of accuracy within the mold. Further, abrasive tools made in accordance with this process require additional finishing after the firing step; that is, the tool must actually be ground to the desired shape and each tool must be individually balanced to permit sustained operation at the high speeds normally used. The extent to which these tools must be ground to achieve the finished shape is relatively slight for tools in the form of simple circular discs; however, more costly steps are involved in the manufacture of abrasive tools in the complex shapes needed for devices employed in certain specialty operations.

This invention relates to the method of producing porous ceramic articles of uniform, accurate and complex shaped structure by casting or die molding. The invention utilizes a liquid suspension of ceramic grains which can be poured into a form or injected into a die of the desired configuration. A particular feature of the invention resides in the manner of achieving a uniform distribution of the powdered ceramic in the liquid suspension for an adequate working time despite the normal tendency of a granular material to settle out. The uniform dispersion of the ceramic grains is obtained by employing a fine solid particulate material in the liquid which vaporizes or is burnt away at or below the temperature required to bond the article. The process permits porous articles of simple or exceedingly intricate shapes to be easily produced.

In the novel process, coarse grained ceramic powder and a powdered bonding material are mixed with a molten hydrocarbon, such as liquid paraffin, to form a slurry. To assure the uniform dispersion of the powdered materials in the liquid phase, a suspending agent, such as finely divided graphite or polystyrene, is added to the slurry. The slurry may be poured into a mold or injected, under slight pressure, into a die. The slurry, being a liquid suspension, conforms precisely to the configuration of the form, permitting intricate shapes to be produced with accuracy. Upon cooling of the slurry, the paraffin solidifies forming a "green piece" having random grains and powdered bonding materials distributed uniformly throughout the piece. After solidification, the green piece is removed from the mold or die and is packed and supported in an inert porous refractory powder, such as alumina. The green piece, while so packed, is heated to drive off the paraffin and burn out the suspending agent. After a length of time sufficient to drive off all the paraffin and suspending agent, the temperature is increased to a level where the bonding material melts and adheres to the ceramic grains. Because the paraffin and the suspending agent do not remain in the final product, the porosity of the finished piece is determined by the volume of those "fugitive" materials. Consequently, by increasing or decreasing the amount of paraffin and suspending agent that is used in the slurry, the porosity of the finished piece can be controlled over a wide range.

A specific example of the process as applied to various materials is set forth below. It should be understood that this example illustrates the capabilities of the process and is not intended as limitation upon the scope of the invention.

A powder of finely divided flake-like graphite, milled to a fineness permitting it to pass through a screen of three hundred and twenty-five (325) mesh, is dispersed in a paraffin. The paraffin is characterized by a low melting point, a low viscosity when molten, and a vaporization point below the melting point of the bonding material, which in this example is glass frit of minus three hundred and twenty-five (−325) mesh. Wherever "paraffin" is employed in the specification, a material having the foregoing characteristics is intended. To thirty-six (36) grams of molten paraffin, thirty-one and a half (31.5) grams of the finely divided graphite powder is added while the paraffin is being agitated. Five hundred and forty (540) grams of aluminum oxide (corundum), of sixty (60) mesh coarse grains is added to the agitated paraffin together with one hundred (100) grams of powdered glass frit.

The solid materials may be added to the paraffin simultaneously or in any desired sequence. The temperature of the liquid suspension is then brought from the melting point of the paraffin up to 121° C. and the slurry is constantly agitated to maintain turbulence for a time sufficient for the slurry to "outgas." A period of thirty minutes was found to be adequate for outgassing the slurry. The temperature should not be allowed to exceed the point, about 200° C., at which vaporization of the paraffin begins. Following outgassing of the slurry, the mixture can be permitted to solidify in ingots or bars and stored until needed for casting or injection molding.

It should be observed that during the "outgassing" time the molten mixture may be agitated to assure uniform dispersion of all of the materials utilized. However, during the time required for solidification, the stirring action must be discontinued, but through the use of the flake-like graphite suspending agent, the heavier grains of abrasive and glass frit are retained in substantially uniform suspension. The solidified ingots or bars are thus completely uniform.

For casting, the ingot material is heated until it again becomes a slurry and the slurry is then poured into a mold which has been coated with silicone grease or some other parting agent. When used for injection molding, the slurry can be injected at pressures as low as twenty pounds per square inch (20 p.s.i.) using conventional low pressure injection molding equipment.

The material in the mold is permitted to cool and solidify. Here again, the flake-like graphite suspending agent maintains the homogenity of the mixture during cooling and up to the point of solidification.

The solidified green piece is removed from the mold and packed in alumina powder that is of a fineness permitting it to pass through a screen of three hundred and twenty (320) mesh. The package is heated slowly, as for example at a rate of temperature increase of 1.5° C. per minute. As the temperature rises, the paraffin vaporizes and is driven off, except that some of the paraffin may break down and remain as carbon residue. A further increase in temperature causes the oxidation of such carbon residue and the graphite powder. Finally, as the temperature reaches about 1,000° C. the glass frit is molten and flows uniformly into adhering contact with the coarse alumina grains.

It should be noted that the paraffin and the finely divided carbon burn off without leaving a residue. Upon cooling the ceramic grains are bonded together by the vitrified glass frit, however, a substantial volume of the resultant structure is taken up by interconnected voids as desired for products of this class. The porous solid structure, when sufficiently cooled, is removed from the package and brushed and finished to remove any adherent alumina powder. The porosity of the finished item is approximately forty percent (40%) of the total volume, the porosity being in the form of interconnected voids.

It is apparent that the shape of the final product is determined by the shape of the mold. Since a liquid suspension has been used, intricate angles and shapes may be formed with ease since the liquid will readily flow into and fully fill the mold with either casting or injection techniques. This permits the formation of tools with no limitation upon shape, as distinguished from the aforementioned prior processes where a relatively thick mass of material was used. The configuration of the die is repeated in the final product, under the concepts of this invention, so that few or no subsequent finishing steps are required.

A wide range of abrasive materials may be used in conjunction with or to replace the ceramic materials specified in the example. For example, in addition to corundum ($Al_2O_3$) and zirconium dioxide ($Z_rO_2$), abrasive materials such as silicon carbide (SiC), and mullite ($3Al_2O_3 \cdot 2SiO_2$) can be employed in the process. In addition to finely divided graphite, a fine powder of polystyrene has been found to be suitable as a suspending agent for the coarse grained abrasives.

The process permits a selection over a wide range of the volume percentages of bonding material, abrasive material, and voids in the final product because those volume percentages are determined in large measure by the amount of the various constituents of the slurry.

The scope of the present invention should be construed by the appended claims.

What is claimed is:

1. A process of forming a porous abrasive object comprising the steps of: forming a slurry from a molten meltable binder in which a relatively coarse granular abrasive material is mixed with a relatively fine powdered glass frit and a solid particulate suspending agent selected from the group consisting of graphite and polystyrene, introducing said slurry into a mold and allowing said meltable binder therein to solidify to form a solid green piece, packing said green piece in an inert refractory powder having a melting point above those of said abrasive material and said glass frit, heating the packed green piece to a temperature sufficiently high to vaporize said meltable binder and oxidize and drive off said suspending agent, the temperature required for said vaporization and said oxidation being substantially lower than the melting temperature of said glass frit, thereafter raising the temperature to cause said glass frit to melt and adhere to said granular abrasive material, and thereafter removing said abrasive object from said inert refractory powder.

2. A process for forming a porous abrasive object comprising the steps of: forming a slurry from a molten paraffin in which a relatively coarse granular abrasive material is mixed with a relatively fine particulate suspending agent selected from the group consisting of graphite and polystyrene and a relatively fine powdered bonding material meltable at a temperature of approximately 1000° C., the vaporization temperature of the paraffin and the burn-off temperature of the suspending agent being substantially less than the melting temperature of said bonding material, introducing said slurry into a mold and allowing said paraffin therein to solidify to form a solid green piece, packing said green piece in an inert refractory powder having a melting point above that of said abrasive material and said bonding material, heating the packed green piece to a temperature at which said paraffin vaporizes and said suspending agent burns off but below the melting temperature of said bonding material for a period of time sufficient to free said green piece of said paraffin and said suspending agent, thereafter further elevating the temperature to a level causing said bonding material to melt and flow into adhering contact with said granular abrasive, cooling said abrasive object and removing it from the inert refractory powder packing, whereby the porosity of the resulting object when cooled is in the form of interconnected voids approximating the volume previously occupied by said paraffin and suspending agent.

3. A process for forming a porous abrasive object comprising the steps of: forming a slurry from a molten paraffin in which a relatively coarse granular aluminum oxide is mixed with a relatively fine flake-like graphite suspending agent and a relatively fine powdered glass frit meltable at approximately 1000° C., said melting temperature being in excess of the vaporization temperature of said paraffin and the burn-off temperature of said graphite, outgassing said slurry, introducing said slurry into a mold and allowing said paraffin therein to solidify to form a solid green piece, packing said green piece in an inert refractory powder having a melting point above that of said granular aluminum oxide and said glass frit, heating said green piece to a temperature at which said paraffin vaporizes and said graphite burns off but below said melting temperature of said glass frit for a period of time to free said green piece of paraffin and graphite, thereafter further elevating the temperature to a level where said glass frit melts and flows into adhering contact with said aluminum oxide, cooling said abrasive object and removing it from said inert refractory powder packing.

4. A process for forming a porous abrasive object comprising the steps of: forming a slurry from a molten paraffin in which aluminum oxide of 60 mesh coarse grains is mixed with a relatively fine flake-like graphite suspending agent and powdered glass frit of minus 325 mesh meltable at approximately 1000° C., said melting temperature being substantially in excess of the vaporization temperature of said paraffin and the burn-off temperature of said graphite, outgassing said slurry, introducing said slurry into a mold and allowing said paraffin to solidify to form a solid green piece, packing said green piece in an inert refractory supporting powder having a melting temperature above that of said aluminum oxide grains and said glass frit, heating the packed green piece to a temperature at which said paraffin vaporizes and said graphite burns off but below said melting temperature of said glass frit for a period of time sufficient to free said green piece of said paraffin and said graphite, thereafter further elevating the temperature to a level to cause said glass frit to melt and to flow into adhering contact with said aluminum oxide grains, and removing said abrasive object from said inert supporting powder.

References Cited

UNITED STATES PATENTS

| | | | |
|---|---|---|---|
| 2,085,137 | 6/1937 | Wooddell et al. | 51—296 |
| 2,140,650 | 12/1938 | Quick et al. | 51—296 |
| 1,555,086 | 9/1925 | Tilton et al. | 51—296 |
| 1,986,850 | 1/1935 | Pohl et al. | 51—296 |

FOREIGN PATENTS

| | | |
|---|---|---|
| 448,454 | 6/1936 | Great Britain. |
| 473,681 | 1/1936 | Great Britain. |

DONALD J. ARNOLD, *Primary Examiner.*

U.S. Cl. X.R.

51—298, 305, 308; 264—44